UNITED STATES PATENT OFFICE.

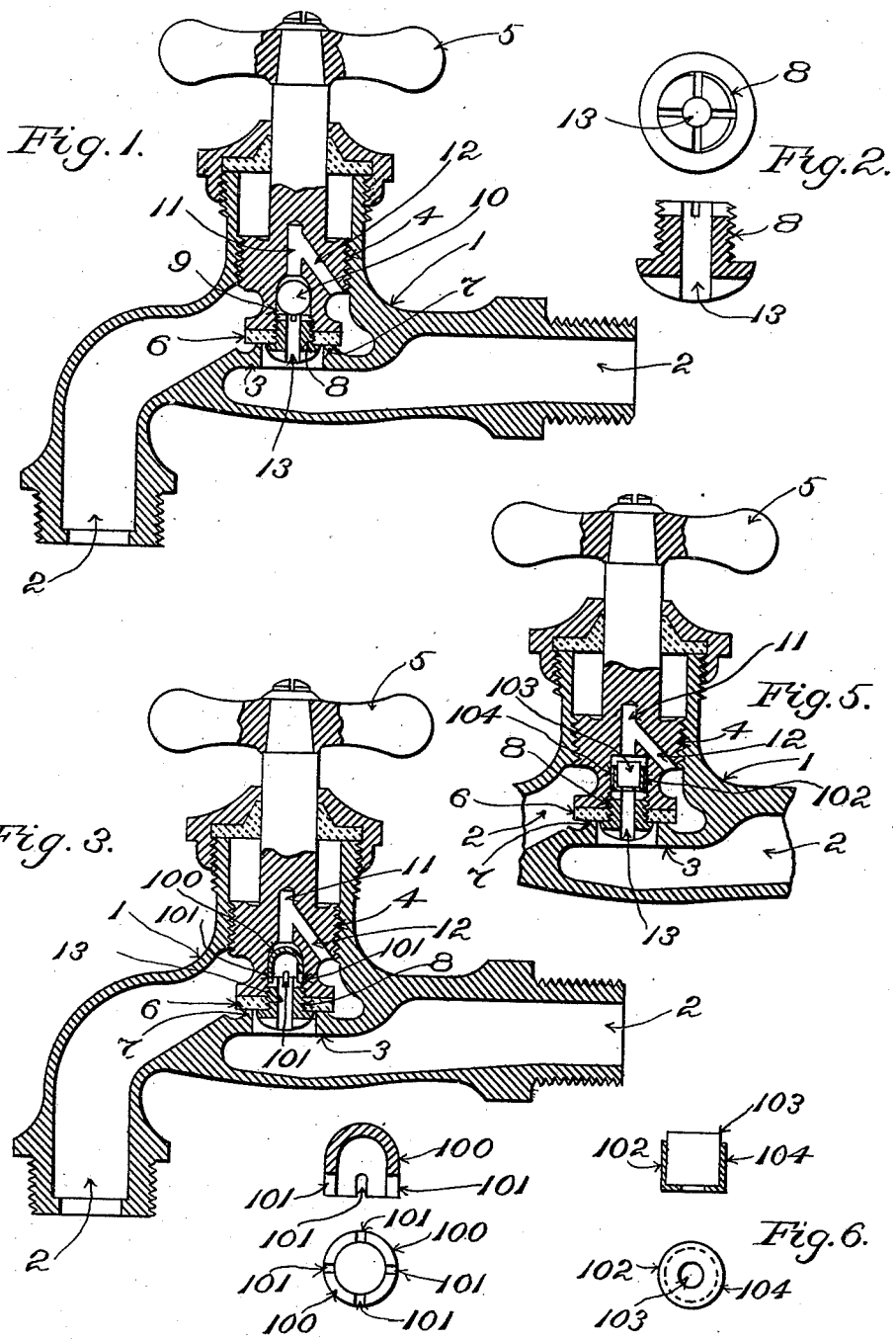

ISAAC OSGOOD, OF AMESBURY, MASSACHUSETTS.

FAUCET.

SPECIFICATION forming part of Letters Patent No. 668,355, dated February 19, 1901.

Application filed May 7, 1900. Serial No. 15,667. (No model.)

*To all whom it may concern:*

Be it known that I, ISAAC OSGOOD, a citizen of the United States, residing at Amesbury, in the county of Essex, State of Massachusetts, have invented a certain new and useful Improvement in Faucets, of which the following is a specification, reference being had therein to the accompanying drawings.

At times it becomes necessary to close the connection between a street-main and the water-pipes of a house system. A cock is provided for the purpose, as is well known, the same being located usually in the cellar of the house. In connection with the said cock is provided a waste or drainage orifice, which is opened by the operation of closing the cock. Through this orifice water contained in the higher portions of the piping escapes, it being intended that thereby the said upper portions shall become emptied of their contents in order to prevent damage from freezing in cold weather and sometimes for other reasons. As is well known, ordinarily it is necessary, in order that the water may all flow down and out at the orifice in question, to open faucets in the upper part of the house, so that air may enter, and thus facilitate the escape of the water.

The aim of the invention is to provide in novel and improved manner for obviating the necessity for opening the faucets by hand to facilitate the downflow of water and its escape through the discharge or waste orifice.

The invention consists in a vented faucet embodying certain novel features of construction, which I will now proceed to describe with reference to the accompanying drawings, in which latter I have illustrated the best embodiments of the invention that I have yet contrived.

In the drawings, Figure 1 shows in vertical longitudinal section a faucet containing one embodiment of the invention. Fig. 2 shows, detached, the screw which in Fig. 1 holds the packing and check-valve in place. Fig. 3 is a view similar to Fig. 1, showing a modification. Fig. 4 shows, detached, the valve of Fig. 3. Fig. 5 is a sectional view illustrating a third embodiment. Fig. 6 shows views of the valve of Fig. 5.

Having reference to the drawings, 1 designates the body of the faucet. 2 is the water-passage therethrough.

3 is the diaphragm.

4 is the externally-threaded valve-plug with its handle 5, by means of which to turn the same, and 6 is the packing on the end of the said valve-plug working against the usual seat at 7 on the upper side of the diaphragm 3 around the orifice through the said diaphragm.

8 is a screw serving to hold the packing 6 against the end of the valve-plug 4. The stem of the said screw passes through a central hole in the disk 6 of packing and enters a bore 9, extending upwardly into the end of the valve-plug 4, the said bore being threaded and engaged by the corresponding thread of the stem of the screw in obvious manner. In accordance with the invention I extend the bore 9 inwardly lengthwise of the valve-plug 4 farther than is required for the reception of the stem of the screw 8, and thereby form a chamber to receive a check-valve 10. The said check-valve is retained in the said chamber by the screw 8. In continuation of the bore 9 I form a second and smaller bore 11, which is concentric with the bore 9. I also form an oblique bore or passage 12 through the valve-plug, it intersecting the smaller bore 11 and also communicating directly with the interior space 2 of the body of the faucet beyond the valve-seat 7 of the diaphragm 3. I form the screw 8 hollow or tubular, the central passage therethrough being designated 13.

As will be obvious, the operations of producing the bores 9 and 11 and the passage 12 in the valve-plug 4 may be quickly and cheaply performed, while the work of assembling requires simply that the valve 10 shall be dropped into the larger bore 9 and that the screw 8 shall be passed through the packing 6 and turned into the said bore 9.

When the faucet is applied to the service-pipe of a house and the latter is filled with water under the usual pressure, the said pressure will be transmitted to the valve 10 in consequence of a portion of the water finding its way through the passage 13 of the screw 8, and said pressure will act to raise the said valve against the valve-seat at the inner end of the bore 9. So long as the water continues under pressure within the pipe the valve will be held in close contact with the valve-seat. When, however, the pressure is shut off at the service-cock and the drainage-orifice is opened, the valve 10 will be forced away from its valve-seat by atmospheric pressure and air will flow inwardly through the passage 12 and bore 11, through the larger bore 10, around the valve 9, and thence through the passage 13 of screw 8 into the water-space of the faucet.

Suitable provision will be made for facilitating the passage of the air by the valve 10 and into the passage 13 of screw 8. Fig. 2 shows the inner end of the screw 8 formed with transverse slots or notches 14 for the purpose.

The ball shown in Fig. 1 is advantageous for use as a valve, since it cannot become deranged in working through change of the position thereof and cannot become clogged or cramped in its action.

Figs. 3 and 4 show a cup-shaped valve 100, the convex surface of which is arranged to make contact with the valve-seat at the inner end of the bore 9, the hollow side of the said valve being turned toward the screw 8. The said cup-shaped valve has sufficient length to prevent it from becoming tilted and cramped in the bore 9, which would interfere with the proper working thereof.

For the purpose of setting and guiding the cup-shaped valve 100 somewhat the inner end of the screw 8 is represented in Fig. 3 as reduced in diameter and projecting a short distance into the hollow interior of the said cup-shaped valve. For the purpose of facilitating the passage of the air by the valve 100 into the central passage of the screw 8 the lower edge of the cup is shown formed with notches 101.

I contemplate in some cases the employment of a valve composed wholly or in part of suitable packing material. Thus Figs. 5 and 6 show an embodiment of the invention in which the valve 102 comprises a short cylinder of packing material 103 and a cup-shaped casing 104, within which the said cylinder fits.

It will be perceived that my invention is capable of being applied quickly and conveniently, as well as at exceedingly small cost, to the common form of faucet at present in extensive use, and this consideration has carefully been kept in mind in contriving the same.

I claim as my invention—

1. The faucet having the valve-plug thereof formed with the longitudinal bores 9 and 11 and with the passage 12 intersecting the said bore 11 and communicating directly with the interior discharge-space of the faucet beyond the valve-seat within the latter, the valve occupying the inner portion of the bore 9, the hollow screw 8 fitting within the said bore and retaining the valve therein, and the packing held to the end of the valve-plug by the said screw, substantially as described.

2. The faucet having the valve-plug thereof formed with the longitudinal bores 9 and 11, and means of direct communication between said bore 11 and the interior space of the faucet beyond the valve-seat within the latter, the yielding valve occupying the inner portion of the bore 9, the hollow screw 8 fitting within the said bore and retaining the valve therein, and the packing held to the end of the valve-plug by the said screw, substantially as described.

In testimony whereof I affix my signature in presence of two witnesses.

ISAAC OSGOOD.

Witnesses:
   CHAS. F. RANDALL,
   WILLIAM A. COPELAND.